United States Patent [19]

Siers

[11] Patent Number: 5,788,190
[45] Date of Patent: Aug. 4, 1998

[54] SLOTTED CRUISE TRAILING EDGE FLAP

[75] Inventor: Geoffrey L. Siers, Kent, Wash.

[73] Assignee: The Boeing Company, Seattle, Wash.

[21] Appl. No.: 735,233

[22] Filed: Oct. 22, 1996

[51] Int. Cl.$^6$ .................................. B64C 3/50; B64C 9/20
[52] U.S. Cl. .................... 244/212; 244/215; 244/216
[58] Field of Search ........................ 244/210, 211, 244/212, 213, 215, 216, 218

[56] References Cited

U.S. PATENT DOCUMENTS

| | | |
|---|---|---|
| D. 232,713 | 9/1974 | Cook et al. . |
| D. 245,157 | 7/1977 | Seidel . |
| 1,770,575 | 7/1930 | Ksoll ........................... 244/212 |
| 2,034,218 | 3/1936 | Weick et al. ................. 244/212 |
| 2,271,763 | 2/1942 | Fowler ..................... 244/216 X |
| 2,635,837 | 4/1953 | Grant . |
| 2,908,454 | 10/1959 | Wolff ........................... 244/216 |
| 3,480,235 | 11/1969 | Multhopp . |
| 3,493,196 | 2/1970 | McCall ........................ 244/216 |
| 3,767,140 | 10/1973 | Johnson . |
| 3,897,029 | 7/1975 | Calderon . |
| 4,120,470 | 10/1978 | Whitener . |
| 4,444,368 | 4/1984 | Andrews . |
| 4,448,375 | 5/1984 | Herndon ................... 244/215 X |
| 4,575,030 | 3/1986 | Gratzer . |
| 4,669,687 | 6/1987 | Rudolph ...................... 244/215 |
| 4,784,355 | 11/1988 | Brine . |
| 4,854,528 | 8/1989 | Hofrichter ................ 244/216 X |
| 4,955,575 | 9/1990 | Stephenson ................... 244/216 |

OTHER PUBLICATIONS

Drela, Mark, "*Design and Optimization Methods for Multi-Element Airfoils,*" AIAA 93–0969, AIAA/AHS/ASEE Aerospace Design Conference, Feb. 16–19, 1993, Irvine, California.

*Primary Examiner*—William Grant
*Attorney, Agent, or Firm*—Christensen O'Connor Johnson & Kindness PLLC

[57] ABSTRACT

A slotted cruise trailing edge flap (16) having a single-slotted configuration during cruise, and a double-slotted configuration during takeoff and landing is disclosed. The slotted cruise trailing edge flap (16) includes a flap assembly (18) positioned along the trailing edge of an aircraft wing (30). The flap assembly (18) includes a vane element (22) and a main element (24) mounted in a fixed relation to one another that defines a slot (25) therebetween. The slotted cruise trailing edge flap also includes an extension assembly (20) that includes a support structure (23) from which the flap assembly (18) is translatably connected via a track (44) and carriage (46) arrangement. The flap assembly (18) is rotatably connected to the support structure (23) using a cam follower (52) and cam slot (50). An actuation mechanism (28) including a rotary actuator (56) moves the flap assembly (18) relative to the support structure (23). In a stowed position, the vane element (22) preferably nests into the wing (30) such that the slot (25) remains available to direct airflow from the wing lower surface to the wing upper surface. In an extended position, the vane and main elements (22), (24) form a double-slotted arrangement created by the flap assembly translating rearward and rotating downward relative to the wing (30).

16 Claims, 4 Drawing Sheets

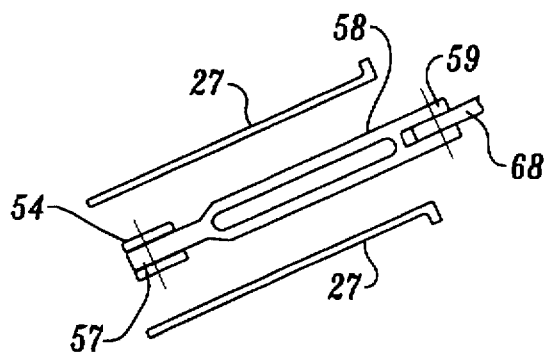
Fig. 4
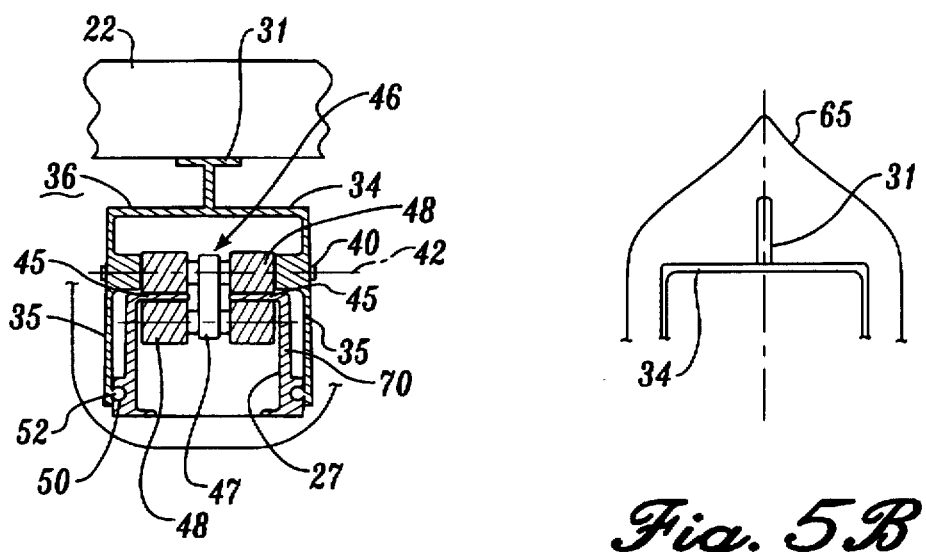
Fig. 5A
Fig. 5B

SLOTTED CRUISE TRAILING EDGE FLAP

FIELD OF THE INVENTION

The present invention relates to flap arrangements for aircraft wings, and more particularly, to double-slotted trailing edge flaps.

BACKGROUND OF THE INVENTION

Various types of single- and multiple-slotted flaps are currently used during takeoff and landing to increase lift and improve aircraft maneuverability. During cruise, however, slots were previously thought to hold no value. Instead, designers have consistently tried to minimize the amount of airflow interruption experienced along the wing upper surface, particularly at the seam created between the flaps and the wing trailing edge or spoilers. See, for example, U.S. Pat. No. 4,120,470.

It has recently become known that a spanwise slot of suitable contour positioned along the wing trailing edge can provide an aerodynamic benefit in the cruise regime by shaping the slot in such a way as to promote a controlled airflow from the lower to the upper surface of the wing. The addition of air from under the wing can actually re-energize the boundary layer on top of the wing. This results in a decrease in drag for a given airspeed. It is possible to trade this benefit for a decreased wing sweep with a possible resultant decrease in weight. A leading article regarding this phenomenon is *Design and Optimization Method for Multi-Element Airfoils*: Paper No. 93-0969, by Mark Drela, presented at the Aerospace Design Conference (Feb. 16-19, 1993) sponsored by the American Institute of Aeronautics and Astronautics.

SUMMARY OF THE INVENTION

In accordance with the present invention, a trailing edge flap having a single-slotted configuration during cruise and a double-slotted configuration during takeoff and landing is provided. The trailing edge flap includes a flap assembly that includes a vane airfoil element and a main airfoil element. The vane and main elements have a fixed relation to one another that defines a permanent slot therebetween. In a stowed position, the vane element nests into the wing such that the slot remains available to direct airflow from the wing lower surface to the wing upper surface. In an extended position, the vane and main elements translate rearward and rotate downward causing a second slot to form between the vane element and the wing trailing edge. Alternatively, the present invention may be formed to avoid the formation of the second slot by simply rotating the flap assembly downward without translating aft.

In accordance with further aspects of this invention, the flap assembly is supported at multiple lateral support locations positioned along the wing trailing edge. Each support location includes an extension assembly for moving the vane and main elements between stowed and extended positions. The flap assembly further includes a pallet having an upper surface and opposed pallet sidewalls. Pallets are provided at each support location. The vane and main airfoil elements are mounted to the pallet upper surface. A central pivot axis extends between the pallet sidewalls in a lateral direction. The extension assembly includes a support structure from which the pallets are translatably and rotatably connected. In particular, a frame is provided having side panels oriented in a generally vertical-longitudinal plane and cantilevered from the wing rear spar. In the stowed position, the pallet sidewalls are positioned closely adjacent the outer surfaces of the frame side panels, thus forming a sleeve-type arrangement. An outer fairing is attached to the wing to surround portions of the extension assembly at each support location.

In accordance with other aspects of this invention, the support structure further includes a carriage translatably engaged with a track. The track is attached to the frame between the frame side panels. The carriage includes at least one wheel located below the track and at least one wheel located above the track. The carriage is rotatably connected to the pallet, preferably, by locating the central pivot axis coextensive with one of the carriage wheel axes. The support structure further includes a cam slot located near a lower region of each frame side panel outer surface. A cam follower formed in each pallet sidewall interior surface engages its respective frame side panel cam slot. The flap assembly may be made to follow a unique deflection path by altering the shape and position of the cam and track arrangements. In a preferred embodiment, the track and cam slot are shaped to cause the pallet to first translate afterward and then rotate downward in going from a stowed position to a fully extended position.

In accordance with still other aspects of this invention, an actuation mechanism is provided that includes a rotary actuator linked to the pallet to cause the flap assembly to rotate about the central pivot axis. In a preferred embodiment, the rotary actuator turns a radial arm that is pivotably connected to one end of an idler link. An opposite end of the idler link is pivotably connected to an extension tab located at a forward region of the pallet near the pallet upper surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a cross-sectional side view along line 4—4 of FIG. 2 showing the idler link included in the slotted cruise trailing edge flap shown in FIGS. 1-3;

FIG. 5A is a cross-sectional view along line 5A—5A of FIG. 1 showing the carriage assembly included in the slotted cruise trailing edge flap shown in FIGS. 1-3; and FIG. 5B is a partial cross-sectional view along line 5B—5B of FIG. 1 showing portions of the outer fairing included in the slotted cruise trailing edge flap shown in FIGS. 1-3.

DETAILED DESCRIPTION OF THE PREFERRED EMBODIMENT

Figure 1:
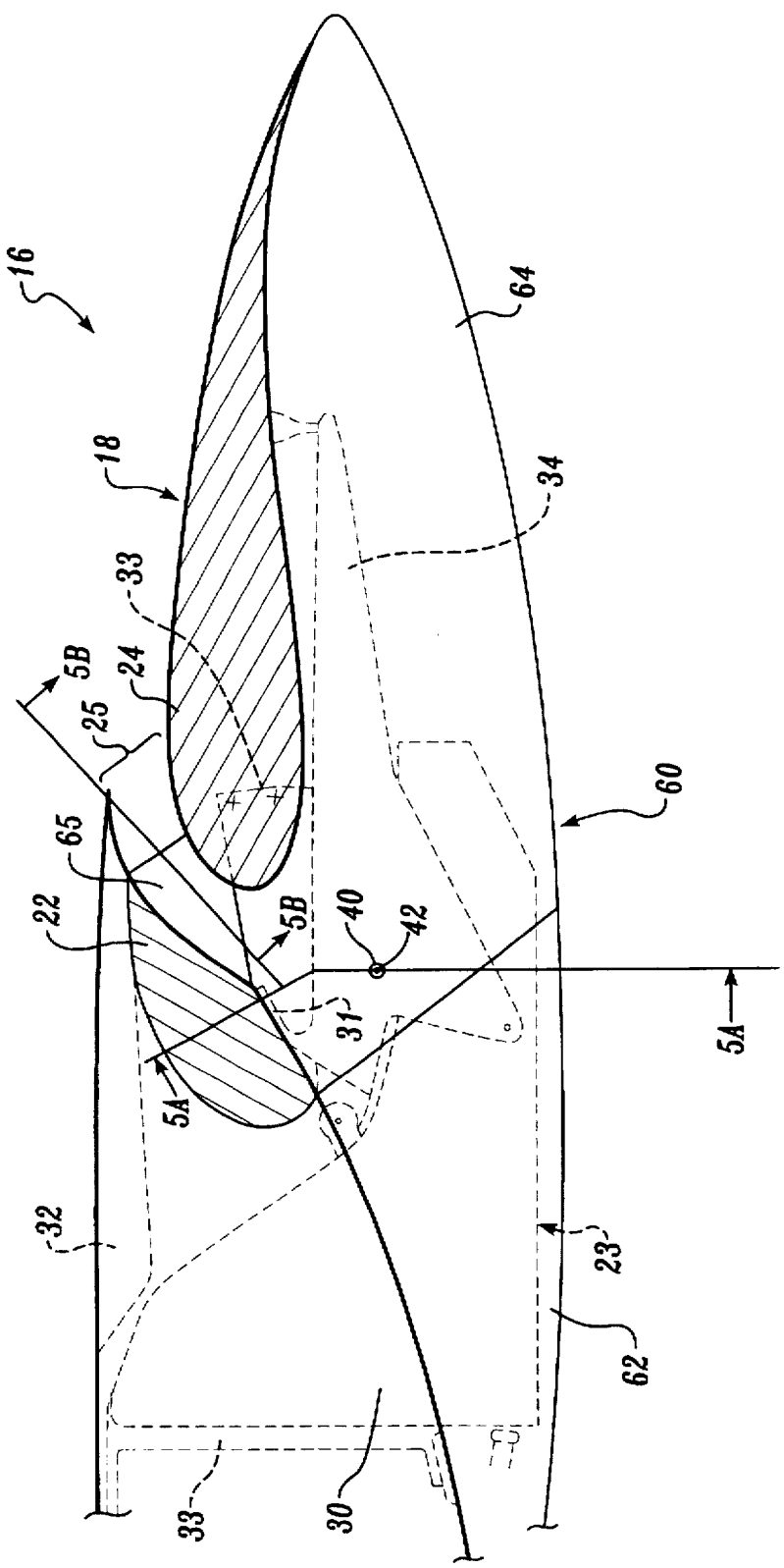
FIG. 1 is a simplified cross-sectional side view of a slotted cruise trailing edge flap formed in accordance with the present invention shown in a stowed position.

As will be known to those skilled in the art of airplane wing design, an airplane wing 30 includes a number of rigid spars that extend the lateral (i.e., spanwise) distance of the wing. Ribs interconnect the spars to provide longitudinal structural support. Upper and lower skins are attached to the ribs and spars to close out the wing and to form a smooth, aerodynamic airflow surface. Of particular interest to the present invention is the wing rear spar 31 shown schematically in FIGS. 1—3 in combination with the rear fragment of a wing 30. The components of the present invention are generally located aft of, and are structurally supported by, the wing rear spar 31.

In general, a slotted cruise trailing edge flap 16 formed in accordance with the present invention has a single-slotted configuration during cruise, and a double-slotted configuration during takeoff and landing. This is accomplished by a flap assembly 18 that is movable between a stowed position and an extended position. In the stowed position a single slot is present, and in the extended position two slots are present. More specifically, flap assembly 18 includes two airfoil elements, a vane element 22 and a main element 24, that are arranged in fixed relation to one another. The space between the airfoil elements forms a permanent single slot 25. At various support locations along the wing trailing edge, the flap assembly 18 is movably connected to an extension assembly 20 that is secured to the wing rear spar 31. The extension assembly 20 includes a support structure 23 to which the flap assembly 18 is translatably and rotatably connected. The extension assembly 20 further includes an actuation mechanism 28 that moves the flap assembly 18 relative to the support structure 23. In a stowed position, the vane flap 22 nests into the wing 30 such that the permanent single slot 25 remains available to direct airflow from regions below the wing to regions above the wing. In an extended position, the vane and main elements 22, 24 form a double-slotted arrangement by rotating downward and translating rearward relative to the wing 30.

In more detail, the vane and main airfoil elements 22, 24 are attached to the wing 30 at a number of spanwise support locations positioned at short intervals along the wing trailing edge. One embodiment of a support location is shown in the cross-sectional side views of FIGS. 1–3. As best seen in FIGS. 2 and 3, the vane and main elements 22, 24 of the flap assembly 18 are formed in a conventional manner, e.g., by attaching outer skins to one or more lateral structural members. The contours and size of the airfoil elements 22, 24 and the slot 25 will depend on the specific application. At each support location, the elements 22, 24 are mounted atop a pallet 34 having a generally flat upper surface 36. The airfoil elements can be affixed to the pallet upper surface 36 using any one of several known methods, such as welding, riveting, bolting, or the like. For example in FIG. 1, the pallet includes structural extensions 31, 33 to which the vane and main elements are attached. The chosen mounting method must maintain the airfoil elements in a fixed relation during both stowed and extended positions so as to maintain the slot 25 therebetween. The slot 25 width will depend on the requirements of a specific application as well as the slot's proportions relative to variations in wing chord and wing thickness.

Figure 2:
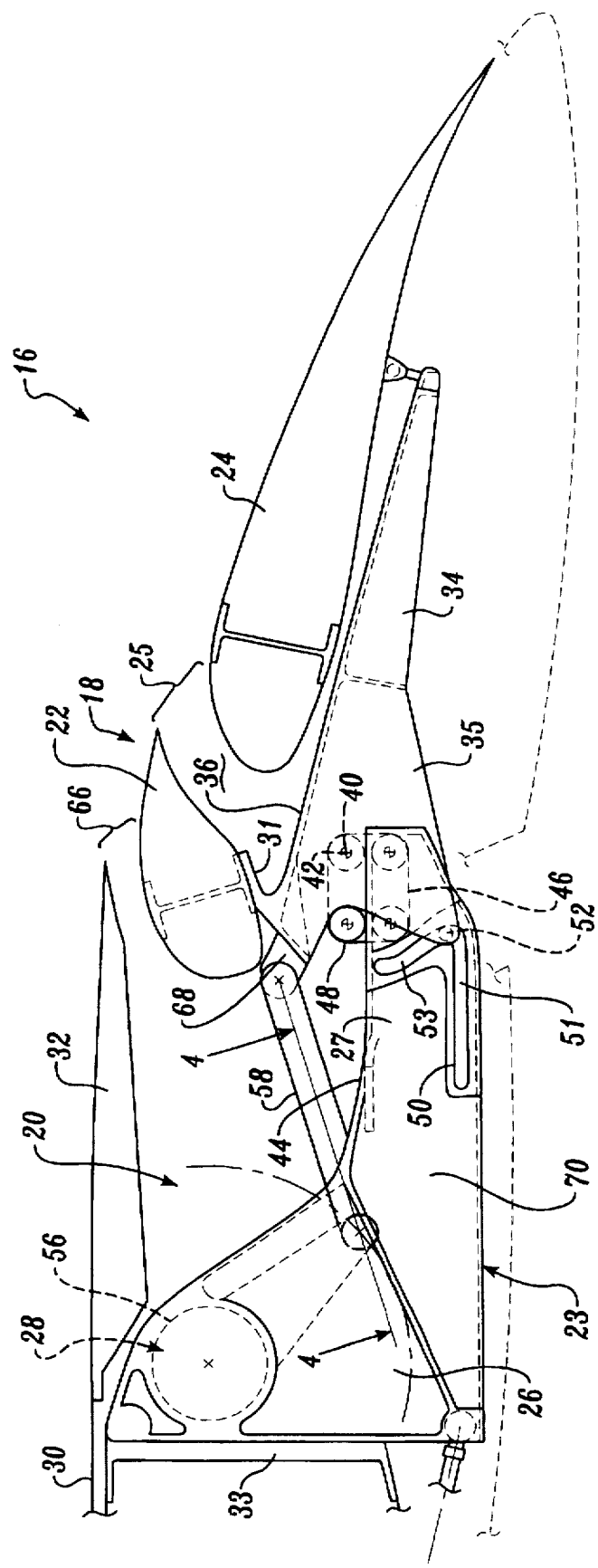
FIG. 2 is a cross-sectional side view of the slotted cruise trailing edge flap of FIG. 1 shown in a partially extended position.
Figure 3:
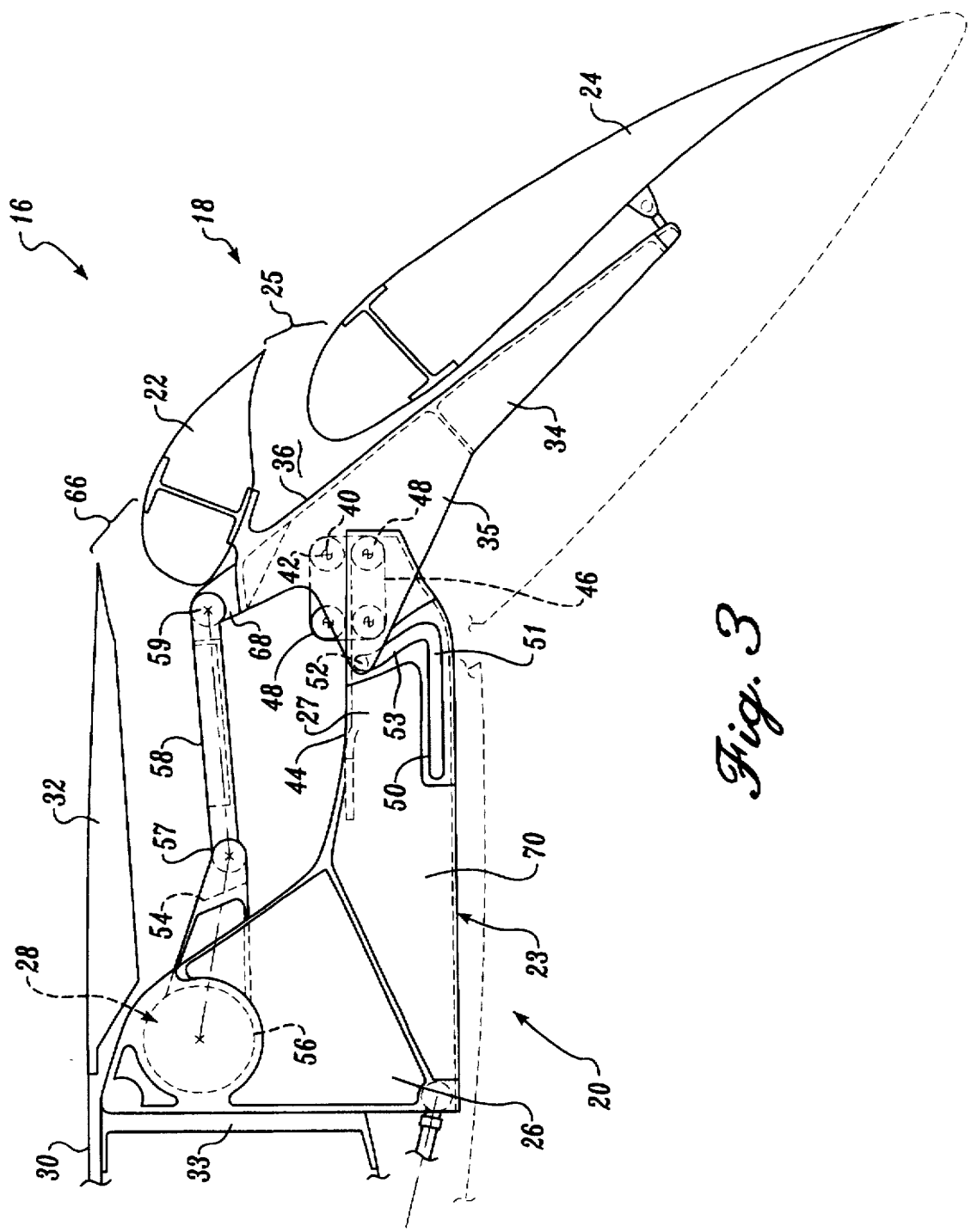
FIG. 3 is a cross-sectional side view of the slotted cruise trailing edge flap of FIG. 1 shown in a fully extended position.

The rear fragment of the wing 30 shown in FIGS. 1–3 includes a spoiler 32 located on the wing upper surface, near the trailing edge. When the slotted cruise trailing edge flap is stowed, the spoiler 32 overlaps a portion of the vane element 22. The spoiler exterior surface is flush with the wing upper skin exterior surface, and the spoiler interior surface is adjacent to the vane element upper surface when the flap assembly 18 is stowed. Therefore, the vane element 22 is "hidden" beneath the spoiler 32. By positioning the vane element aft edge behind or directly adjacent the spoiler aft edge, the slot 25 will remain open and available to pass air at all times between regions below and above the wing. This arrangement has the additional advantage of allowing the spoiler 32 to be preloaded onto the vane element 22 if need be when the flap assembly is stowed.

At each support location, the extension assembly 20 includes the support structure 23 and the actuation mechanism 28 that moves the flap assembly 18 relative to the support structure 23. Preferably, the flap assembly pallet 34 is rotatably and translatably connected to the support structure 23, while the actuation mechanism 28 is connected directly to the flap assembly pallet 34 in order to force the flap assembly to translate and rotate relative to the support structure 23.

As best seen in FIGS. 2 and 3, the support structure 23 includes a rigid frame 26 having opposed upright side panels 27 oriented in a substantially vertical-longitudinal plane. The upright side panels 27 are cantilevered from the wing rear spar 31. A substantially horizontal track 44 is attached to and between rearwardly extending arms 70 that form part of the opposed frame side panels. Referring to FIG. 5A, the track 44 is formed of two sub-tracks 45 that each extend inwardly from the upper edge of one frame side panel arm toward the opposite frame side panel arm. The sub-tracks 45 may be formed by forging, milling, bending, etc. A small lateral gap exists between the two sub-tracks 45.

The support assembly further includes a carriage 46 that engages the track 44 in a manner that permits carriage translation upon the track in a fore and aft direction. In particular, the carriage 46 includes a vertical center plate 47 having four wheels 48 located on each side, the axes of rotation of the wheels being normal to the faces of the vertical center plate 47. As shown in FIGS. 2, 3, and 5A, the vertical center plate 47 is located between the two sub-tracks 45 so that four of the wheels (i.e., two at each side face) contact the upper surfaces of the sub-tracks 45, and four of the wheels contact the lower surfaces of the sub-tracks. The carriage 46 thereby engages the track 44 in a manner that prohibits vertical or lateral disengagement during translation. The carriage is also connected to the flap assembly pallet, as described in detail below.

As shown in FIGS. 2, 3 and 5A, the support structure 23 further includes a cam slot 50 formed along the outer surface of each frame side panel 27. The cam slot 50 acts as a guide that directs the motion of the flap assembly 18 during use. The illustrated cam slot 50 has two portions. The portions are best seen in FIGS. 2 and 3. A first portion 51 runs horizontally and is located near the lower edge of the frame side panels 27. A second portion 53 stems from the aft end of the first portion 51 and forms an upward arc in the side panels 27. More specifically, the second portion 53 angles upwardly and backwardly, in the direction of the spoiler 32, and then in a forward and upward manner. Therefore, rather than being straight, the second portion is curved. The significance of this cam slot shape will be better understood from the description of the motion of the flap assembly during use that is set forth below.

Referring to FIG. 5A, the pallet 34 includes opposed pallet sidewalls 35 that extend downward from the pallet upper surface 36. The lateral distance between the pallet sidewalls 35 is slightly greater than the lateral distance between the frame side panels 27. This relative sizing permits the pallet sidewalls to straddle the frame side panels 27 in a sleeving manner, where the pallet forms the outer sleeve, and the frame forms the inner sleeve. The pallet 34 is connected to the support structure 23 at two locations on each pallet sidewall 35. The connections are best seen in FIGS. 2 and 3. The first location is at a pivot pin 40 that extends laterally between the pallet sidewalls 35 and through the carriage 46. The pivot pin 40 preferably forms the axle about which the two aftmost carriage upper wheels rotate. The pivot pin location is illustrated in FIGS. 1–3 at a central pivot axis location labeled 42. The second connection location is at the cam slot 50. Each pallet sidewall 35 includes an inwardly-oriented cam follower 52 attached to a lower region of the pallet sidewall. The cam followers 52 are positioned to engage the cam guides 50.

These two connection locations both support the flap assembly 18 and provide a useful method of translating and rotating the flap assembly 18. In particular, the cam guide first portion 51 first guides the flap assembly to translate aft. When the cam followers 52 enter the cam guide second portion 53, the flap assembly 18 is then caused to rotate downward about the pivot pin 40. It should be noted that, depending on the type of actuation mechanism 28 used to move the flap assembly 18, the cam slot 50 and track 44 must be positioned and shaped to allow smooth translation and rotation of the pallet 34. It is important that the components do not bind or conflict. In this regard, the cam slots may be slightly over-sized to allow the cam followers to move easily within the slots.

Referring back to FIG. 1, the support structure 23 further includes an outer fairing 60 at each support location that surrounds the frame 26 and the pallet 34. The fairing 60 provides a smooth exterior surface to enhance airflow along the lower surfaces of the wing and the slotted cruise trailing edge flap. The fairing 60 includes a stationary portion 62 connected to the wing lower surface and a movable portion 64 connected to the pallet 34 at the main element 24. The movable portion 64 includes a smaller portion 65 that extends between the vane element 22 and the main element 24 of the flap assembly. This smaller portion 65 closes out the airflow that is passing between the vane and main elements 22, 24.

The actuation mechanism 28 includes a drive apparatus connected to the frame 26 near the wing rear spar 31 at each support location. A rotary actuator 56 is shown in FIGS. 2 and 3, though, other types drives may be used instead, such as linear actuators, etc. Rotational input to the actuators 56 is provided by an independent power source (not shown). Each rotary actuator 56 is preferably positioned to rotate about a laterally-oriented axis. The rotational output of the actuator 56 is passed through a radially extending arm 54 that connects to one end 57 of an idler link 58 in a pin-and-clevis type arrangement. The opposite end 59 of the idler link 58 is rotatably connected to an extension tab 68 connected to a forward region of the pallet 34. The axes of rotation at the idler link ends 57, 59 are parallel with the rotary actuator axis of rotation. These axes are further parallel with the central pivot axis 42.

In moving from a stowed position to an extended position, rotation of the rotary actuator 56 causes the radial arm and idler link 58 to move aft. This action causes the pallet 34 to translate aftward and, thus, the carriage 46 to translate afterward along the track 44. Specifically, the pallet 34 translates afterward a distance commensurate with the linear distance of the track 44 and the cam slot first portion 51. As shown in FIG. 2, when the cam followers reach the end of the cam guide first portion 51, they continue up the curved second portion 53. The cam followers of FIG. 2 have started into the second portion 53 and have therefore caused a slight rotation about the central pivot axis at the pivot pin. The angle of rotation shown is about 15 degrees. As the cam followers 52 move up the cam slot second portions 53, the actuator 56 rotational energy is used to pivot the flap assembly 18 about the central axis. As may be observed in FIG. 3, very little energy is used past the initial rotation to translate the flap assembly 18 further aft. The flap assembly in FIG. 3 has been rotated downward about 50 degrees. Other motions may be defined for the flap assembly as required in a particular application by simply manipulating the location and shape of the track 44 and cam slot 50.

As will be appreciated from viewing FIGS. 2 and 3, the extended positions of the above-described flap assembly 18 cause a second slot 66 to form between the spoiler 32 and the vane element 22. This is desirable for those applications requiring a double-slotted flap arrangement. In some applications, though, it may be desirable to limit the amount of aft translation of the flap assembly 18. In such instances, the second slot 66 may be omitted by eliminating the cam slot first portion. The vane flap thereby remains in contact with the spoiler.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A slotted cruise trailing edge flap apparatus for use on an aircraft wing, the flap apparatus comprising:
   (a) flap assembly comprising: a main element; a vane element; a pallet, the main and vane elements being mounted on the pallet such that an airflow slot is formed between the main and vane elements; and a cam follower mounted on the pallet; and
   (b) an extension assembly comprising:
      (i) a support structure including a frame connected to the wing, the frame including a cam slot; the support structure further including a carriage translatably engaged with a track, the carriage being rotatably connected to the pallet at a central pivot axis, the cam follower being movably engaged with the cam slot; and
      (ii) an actuation mechanism in pivotable communication with the pallet to cause the pallet to move between stowed and extended positions relative to the support structure such that the airflow slot remains open and available to direct airflow from regions below the wing to regions above the wing at all times during both stowed and extended positions.

2. The slotted cruise trailing edge flap apparatus according to claim 1, wherein the vane and main elements are mounted to an upper surface of the pallet and the pivotable connection of the pallet to the actuation mechanism is located at a forward region of the pallet near the upper surface; the cam slot is located near a lower region of the pallet; and rotation of the pallet relative to the wing is accomplished about the central pivot axis.

3. The slotted cruise trailing edge flap apparatus according to claim 1, wherein the track is longitudinally oriented and the carriage includes at least one wheel located below the track and at least one wheel located above the track.

4. The slotted cruise trailing edge flap apparatus according to claim 3, wherein the at least one wheel located above the track is rotatable about the central pivot axis.

5. The slotted cruise trailing edge flap apparatus according to claim 1, wherein the actuation mechanism includes a rotary actuator rotatably linked to the pallet, wherein actuation of the rotary actuator causes the pallet to rotate about the central pivot axis.

6. The slotted cruise trailing edge flap apparatus according to claim 5, wherein actuation of the rotary actuator further causes the pallet to translate relative to the track.

7. The slotted cruise trailing edge flap apparatus according to claim 6, wherein the track and cam slot are shaped to cause the pallet to first move afterward then rotate downward in going from a stowed position to a fully extended position.

8. The slotted cruise trailing edge flap apparatus according to claim 1, further comprising an outer fairing attached to the wing to surround portions of the support structure.

9. The slotted cruise trailing edge flap apparatus according to claim 1, wherein the airflow slot between the vane and main elements is a fixed distance.

10. The slotted cruise trailing edge flap apparatus according to claim 1, wherein a second airflow slot is formed between the wing and the vane element when the flap assembly is in an extended position.

11. A slotted cruise trailing edge flap apparatus for use on an aircraft wing, the flap apparatus comprising:
   (a) a flap assembly including main and vane elements supported by a pallet; an airflow slot being defined between the main and vane elements; the airflow slot being oven and available to direct airflow from regions below the wing to regions above the wing at all times during both stowed and extended flap assembly positions;
   (b) an extension assembly including:
      (i) a support structure attached to the wing at the pallet, the support structure being movably engaged with the pallet, the movable engagement including rotation about a central pivot axis oriented in a generally lateral direction;
      (ii) at least one actuation mechanism connected to the flap assembly to cause the flap assembly to move between said stowed and extended flap assembly positions relative to the support structure, wherein extension of the flap assembly includes rotation about the central pivot axis.

12. The slotted cruise trailing edge flap apparatus according to claim 11, wherein the support structure includes a carriage translatably engaged with a track, the carriage being rotatably connected to the pallet at the central pivot axis; and the movable connection of the flap assembly to the support structure further includes translation of the pallet along the track.

13. The slotted cruise trailing edge flap apparatus according to claim 11, wherein the actuation mechanism includes a rotary actuator pivotably linked to the pallet.

14. The slotted cruise trailing edge flap apparatus according to claim 13, wherein actuation of the rotary actuator further causes the pallet to translate relative to the support structure.

15. The slotted cruise trailing edge flap apparatus according to claim 14, wherein the support structure is shaped to extend the flap assembly afterward and rotate the pallet downward, with the afterward extension occurring prior to the rotating downward.

16. The slotted cruise trailing edge flap apparatus according to claim 11, wherein the vane element is located forward of the main element; and a second airflow slot is formed between the wing and the vane element when the flap assembly is in an extended position.

* * * * *

UNITED STATES PATENT AND TRADEMARK OFFICE
CERTIFICATE OF CORRECTION

PATENT NO. : 5,788,190
DATED : August 4, 1998
INVENTOR(S) : G.L. Siers

It is certified that error appears in the above-identified patent and that said Letters Patent is hereby corrected as shown below:

| COLUMN | LINE | |
|---|---|---|
| 8 (Claim 12, | 12 line 7) | "track ." should read --track.-- |
| 8 (Claim 15, | 23 line 3) | "afterward" should read --aftward-- |
| 8 (Claim 15, | 24 line 4) | "afterward" should read --aftward-- |

Signed and Sealed this

Eighth Day of December, 1998

Attest:

BRUCE LEHMAN

Attesting Officer

Commissioner of Patents and Trademarks